UNITED STATES PATENT OFFICE.

JAMES H. PAITON, OF CHICAGO, ILLINOIS, ASSIGNOR, BY MESNE ASSIGNMENTS, TO OSRO CHEMICAL CO., OF CHICAGO, ILLINOIS, A CORPORATION OF ILLINOIS.

PROCESS OF MAKING GLUE.

1,318,106.      Specification of Letters Patent.      Patented Oct. 7, 1919.

No Drawing.     Application filed August 17, 1916. Serial No. 115,467.

*To all whom it may concern:*

Be it known that I, JAMES HAROLD PAITON, a subject of the King of England, and a resident of the city of Chicago, in the county of Cook and State of Illinois, have invented certain new and useful Improvements in Processes of Making Glue; and I do hereby declare that the following is a full, clear, and exact description of the same.

The material which I have invented and which I have termed "glue" is capable of a number of uses and constitutes a binder for calcimine, an emulsifier for oils and water used in the manufacture of paint, and also may be used in the sizing of fabrics, warps, yarns, sizing of paper, wall paper and bill posters, and also used as a size for neoplastic walls. This substance will stay sweet without fermenting for an indefinite period, and is sanitary, and is economical in that it does not turn sour and can be dissolved in cold water.

The substance or glue, is made by acting upon flour of all kinds, such as wheat, corn or rye, and starch of all kinds, such as:

Canna, potato, maranta-arrowroot, natal-arrowroot, curcuma-arrowroot. (Potato group.)

Bean, pea, lentil. (Leguminous group.)

Wheat, barley, rye, oat, acorn. (Wheat group.)

Arum, tacca-arrowroot, sago, tapioca. (Sago group.)

Rice, buckwheat, oat, maize, dari, pepper. (Rice group.)

The above is made into glue by one of the following methods:

By treatment in an aqueous solution with either caustic soda, caustic potash, magnesium chlorid, sulfuric acid, hydrochloric acid, zinc chlorid and heat, chlorin gas, or any other agent which will cause the gelatinization of the starch, in case of starches or flour.

Also in cases of starches treated with caustic soda or caustic potash, the excess of alkali must be neutralized to the extent of about 90 per-cent. In cases of sulfuric acid and hydrochloric acid, the excess of acid must be neutralized.

The substance constituting my invention may be made in different ways by varying the formula therefor slightly in different respects, and for the purposes of illustration, I have described in the following, two possible mixtures for the purpose.

Mixture No. 1.

Eighteen pounds of flour, and nine gallons of water are put into a mixer and thoroughly mixed with one another, after which two and six-tenths pints of caustic soda solution are added; the soda solution has a specific gravity of 1.4, and contains thirty-seven per-cent. of caustic soda. The reaction of the constituents of the mixture is allowed to proceed for approximately two hours, while continually stirred in the mixer. The excess of caustic soda is then neutralized to the extent of ninety per-cent. by the addition of sulfuric acid, one pint of acid to four pints of water, and all the ingredients are then intimately mixed together, and this constitutes a glue for calcimine.

Mixture No. 2.

Nine pounds of starch (any kind of starch, preferably corn starch) are mixed with four and one-half gallons of water; one and one-eighth pints of caustic soda solution of 1.9 specific gravity and two and one-fourth gallons more water are then added to the starch solution and all stirred until thoroughly mixed and allowed to stand approximately for twelve hours. The mixture is then agitated and six pints of sulfuric acid added, the strength of which is one part of acid to four pints of water. After this is thoroughly intermixed, four and one-half pints of resin size, mixed in two and one-fourth gallons of water, are added, and the whole stirred until thoroughly incorporated.

The resin size is obtained by dissolving five pounds of resin and two and one-half pounds of borax and two pints of caustic soda solution of 1.4 specific gravity, in ten and one-half pints of water. This is boiled until a solution is obtained, or, in other words, until the constituents are dissolved in the water.

I claim as my invention:

1. The process of making a glue consisting of mixing starch and water, adding thereto an alkali, thoroughly stirring the mixture, then neutralizing the excess of alkali, thereafter adding a resin size and stirring the whole until thoroughly incorporated.

2. The process of making a glue consisting of mixing starch and water, adding thereto an alkali, thoroughly stirring the mixture, then neutralizing the excess of alkali, thereafter adding a resin size, first mixed with water, and stirring the whole until thoroughly incorporated.

3. The process of making a glue consisting of mixing flour and water, and adding thereto an alkali and thoroughly stirring the mixture, then adding sulfuric acid to neutralize the excess of alkali, and thereafter adding a resin size, first mixed with water, and stirring the whole until thoroughly incorporated.

In testimony whereof I have hereunto subscribed my name in the presence of two subscribing witnesses.

JAMES H. PAITON.

Witnesses:
CHARLES W. HILLS, Jr.,
EARL M. HARDINE.